(12) United States Patent
Muske (10) Patent No.: US 10,025,699 B2
(45) Date of Patent: Jul. 17, 2018

(54) METHOD AND SYSTEM FOR REVIEWING OF CLUSTERED-CODE ANALYSIS WARNINGS

(71) Applicant: Tata Consultancy Services Limited, Mumbai, Maharashtra (IN)

(72) Inventor: Tukaram B. Muske, Maharashtra (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 159 days.

(21) Appl. No.: 14/868,873

(22) Filed: Sep. 29, 2015

(65) Prior Publication Data

US 2016/0092340 A1 Mar. 31, 2016

(30) Foreign Application Priority Data

Sep. 29, 2014 (IN) .......................... 3103/MUM/2014

(51) Int. Cl.
*G06F 9/44* (2018.01)
*G06F 11/36* (2006.01)

(52) U.S. Cl.
CPC ...... *G06F 11/3692* (2013.01); *G06F 11/3604* (2013.01)

(58) Field of Classification Search
CPC ......................................................... G06F 9/44
USPC ................................................. 717/130–133
See application file for complete search history.

(56) References Cited

U.S. PATENT DOCUMENTS

| | | | | |
|---|---|---|---|---|
| 5,701,160 A * | 12/1997 | Kimura | ................ | H04N 19/172 375/240.14 |
| 7,386,845 B1 * | 6/2008 | Fox | .......................... | G06F 8/61 717/169 |
| 8,612,941 B2 | 12/2013 | Kumar | | |
| 8,745,578 B2 | 6/2014 | Pistoia et al. | | |
| 8,793,664 B2 * | 7/2014 | Joshi | ................... | G06F 11/3604 717/131 |
| 8,856,764 B2 | 10/2014 | Pistoia et al. | | |

(Continued)

FOREIGN PATENT DOCUMENTS

JP 5665128 2/2015

OTHER PUBLICATIONS

Zachary P. Fry & Westley Weimer, Clustering Static Analysis Defect Reports to Reduce Maintenance Costs, IEEE, 2013, p. 282-291, USA.

*Primary Examiner* — Jae Jeon
(74) *Attorney, Agent, or Firm* — Thompson Hine LLP (57) ABSTRACT

A system and method for reviewing of warning generated during static analysis of a clustered software code by identifying, common point warnings and unique warnings from warnings associated with a software code, and further identifying, a top of must overlapped function for each of the common point warnings. Generating, one or more groups of the common point warnings based on the top of must overlapped function, and assigning, the top of must overlapped function as a constraint for corresponding group of common point warnings. Eliminating, warnings from each of the one or more groups using a review output wherein the review output is identified by reviewing a common point warning from the one or more group under the constraint such that the review of the common point warning under the constraint satisfy for review of all remaining for reviews of all remaining common point warnings of the group.

13 Claims, 4 Drawing Sheets

(56) References Cited

U.S. PATENT DOCUMENTS

| | | | |
|---|---|---|---|
| 2003/0212878 A1* | 11/2003 | Ting | G06F 9/3001 |
| | | | 712/23 |
| 2007/0072091 A1* | 3/2007 | Smith | G03F 7/70458 |
| | | | 430/5 |
| 2007/0074182 A1* | 3/2007 | Hinchey | G06F 8/10 |
| | | | 717/136 |
| 2007/0198450 A1* | 8/2007 | Khalsa | G06Q 10/06 |
| | | | 706/47 |
| 2008/0052647 A1* | 2/2008 | Yamada | G06F 8/20 |
| | | | 716/102 |
| 2013/0258323 A1* | 10/2013 | Kuhn | G01B 11/26 |
| | | | 356/138 |
| 2014/0244645 A1 | 8/2014 | Muske et al. | |

\* cited by examiner

METHOD AND SYSTEM FOR REVIEWING OF CLUSTERED-CODE ANALYSIS WARNINGS

CROSS-REFERENCE TO RELATED APPLICATIONS AND PRIORITY

The present application claims priority to Indian Provisional Patent Application No. 3103/MUM/2014, filed on Sep. 29, 2014, the entirety of which is hereby incorporated by reference.

FIELD OF THE INVENTION

The present application generally relates to reviewing of warnings generated based on static analysis of a program code. Particularly, the application provides a method and system for reviewing of warnings generated during static analysis of clustered code.

BACKGROUND OF THE INVENTION

Static Analysis is most important in validation and verification of safety critical applications. However, in case of large scale applications, static analysis lacks in analysis of thousands of lines of code due to high demand of resources. Thus, scalability remains a bottleneck for static code analysis tools. US 20120291004 A1, (Shrawan Kumar et. al.) explains clustering as a technique for scaling static analysis tools to very large systems.

The software code implementing a certain functionality is termed as a 'cluster', and the cluster is denoted by a function that is entry to the functionality of the software code. The cluster being smaller in code size and less complex than the original software code, the static analysis tools can analyze the multiple clusters individually and separately to produce cluster-specific analysis results.

However while performing static analysis of a cluster code, due to the imprecise nature of static analysis and the conservative approach taken for the inter-cluster communication (data sharing), a large number of analysis warnings are generated. In such cases all the warnings need to be reviewed manually in order to determine if the warnings represent an actual defect. This process consumes a lot of time and effort. Further, a warning for a program point belonging to the multiple clusters gets reported multiple times, that is the warning is generated for each of associated clusters of the program point. Thus, there is a problem of increased number of warnings on clustered software code.

Currently major research in the static analysis is directed towards making the static analysis more precise. However lesser research work have been directed to reduce manual efforts spent during review of the warnings. In the current state of the art, the static analysis tools only report cluster-wise generated warnings in clustered-code analysis. Further, the common point warnings are reviewed cluster-wise, because reviewing common point warnings in context of multiple clusters at the same time requires switching between multiple clusters and switching between multiple clusters becomes tedious. Further information required while reviewing all common-point warnings together in the context of their associated clusters may become too large to manually analyze, and if any review assisting tools is used, the review assisting tool may not scale on the multiple clusters.

A majority of existing solutions relies on grouping of error reports generated during static analysis based on clustering machine-generated defect reports by leveraging syntactic and structural information available in the static bug reports.

However, prior art literature bases the clustering of error report generated during static analysis based on syntactic and structural information, and a group/cluster thus formed can include warnings/defects belonging to different program points, and generally fail to group the warnings belonging to multiple clusters.

Further, the static analysis tools mostly fail to analyze many real world systems as these systems are very large and complex (usually consisting of millions lines of code). Clustering, breaking a system into multiple clusters, is commonly used technique to overcome this issue.

In this technique, scalability of analysis tools is achieved by splitting the system code into smaller code clusters. Such a cluster being smaller and less complex than the original system is analyzable by static analysis tools to produce cluster-specific results. The cluster-wise analysis of system further leads to the increased number of warnings due to conservative analysis for the shared variables. Further, warning for a program point belonging to multiple clusters gets reported multiple times, that is for each of its associated clusters. Thus, there is a problem of large/increased number of warnings on clustered-code.

Currently major research in this static analysis area is directed towards making static analysis more precise, and not much has been done to reduce the manual efforts that are spent during the review of the generated warnings. Currently, there does not exist a technique/method/system that aims to reduce the efforts spent while reviewing the clustered-code warnings.

It is noted that prior art literature remarkably fails to disclose an efficient reviewing technique for warnings generated during static analysis of cluster code software, and therefore this is still considered as one of the biggest challenges of the technical domain.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a system and method for improved reviewing of warnings associated with the clustered software code, by eliminating redundancy in reporting and reviewing of the warnings to reduce manual review efforts.

The present application provides a computer implemented method for reviewing warnings associated with a software code. In one embodiment said method comprises the steps of identifying, by a processor, common point warnings and one or more unique warnings from warnings associated with a software code. The software code is partitioned into multiple clusters and the warnings are generated in a cluster wise analysis of the software code. A common point warning is common with two or more clusters of the multiple clusters. The common point warning may correspond to a single unique program point in the code and getting reported multiple times due to inclusion of the program point into two or more clusters. The method further comprises identifying, by the processor, a top of must overlapped function for each of the common point warnings. The top of must overlapped function for a common point warning is a top most function that is always traversed while reaching from a warning program point to a cluster entry function for associated two or more clusters of the common point warning. The method further comprises generating, one or more groups of the common point warnings based on the top of must overlapped function. The method further comprises assigning, the top of must overlapped function as a constraint for corresponding group of common point warnings. A review based on the constraint is applicable for a review of each of the common point warnings of the same group. The method further comprises eliminating, by the processor, warnings except a common point warning from each of the one or more groups using a review output for the common point warning, wherein the review output is identified by reviewing the common point warning from each of the one or more groups under the constraint such that the review of the common point warning under the constraint satisfy for reviews of all remaining common point warnings of the corresponding group According to another embodiment, the present application provides a system (102) for reviewing warnings associated with a software code. The system (102) comprises a plurality of modules (208), including a warning analyzer module (214) to identify, common point warnings and one or more unique warnings from warnings associated with a software code. The software code is having multiple clusters and the warnings are generated in a cluster wise analysis of the software code such that a common point warning is common with two or more clusters of the multiple clusters. The system (102) comprises a group identifier module (216) to identify, a top of must overlapped function for each of the common point warnings. The top of must overlapped function for a common point warning is a top most function that is always traversed while reaching from a warning program point to a cluster entry function for associated two or more clusters of the common point warning. The group identifier (216) module further generates, one or more groups of the common point warnings based on the top of must overlapped function. The system (102) further comprises a constraint identifier module (218) to assign, by the processor, the top of must overlapped function as a constraint for corresponding group of common point warnings. A review based on the constraint is applicable for a review of each of the common point warnings of the same group. The system also comprises a warning reviewer module (226) to, eliminate, warnings except a common point warning from each of the one or more groups using a review output for the common point warning, wherein the review output is identified by reviewing the common point warning from each of the one or more groups under the constraint such that the review of the common point warning under the constraint satisfy for reviews of all remaining common point warnings of the corresponding group According to yet another embodiment a non-transitory computer readable medium storing instructions which when executed by a possessor on the system (102), causes the processor to perform method for identifying, by a processor, common point warnings and one or more unique warnings from warnings associated with a software code. The software code is partitioned into multiple clusters and the warnings are generated in a cluster wise analysis of the software code. A common point warning is common with two or more clusters of the multiple clusters. The common point warning may correspond to a single unique program point in the code and getting reported multiple times due to inclusion of the program point into two or more clusters. The method further comprises identifying, by the processor, a top of must overlapped function for each of the common point warnings. The top of must overlapped function for a common point warning is a top most function that is always traversed while reaching from a warning program point to a cluster entry function for associated two or more clusters of the common point warning. The method further comprises generating, one or more groups of the common point warnings based on the top of must overlapped function. The method further comprises assigning, the top of must overlapped function as a constraint for corresponding group of common point warnings. A review based on the constraint is applicable for a review of each of the common point warnings of the same group. The method further comprises eliminating, by the processor, warnings except a common point warning from each of the one or more groups using a review output for the common point warning, wherein the review output is identified by reviewing the common point warning from each of the one or more groups under the constraint such that the review of the common point warning under the constraint satisfy for reviews of all remaining common point warnings of the corresponding group.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor (202), a storage medium readable and/or writable by the processor (including, for example, volatile and non-volatile memory and/or storage elements) (206), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors (202) executing a program tangibly embodied on a computer-readable medium (206) to perform functions of the invention by operating on input and generating output. Suitable processors include, by way of example, both general and special purpose microprocessors. Generally, the processor receives (reads) instructions and data (230) from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data (230) disclosed herein may be implemented, for example, in one or more data structures tangibly stored on a non-transitory computer-readable medium, such as memory (206). Embodiments of the invention may store such data in such data structure(s) and read such data from such data structure(s), including, but not limited to, a system database (222) and other data (234).

The present application provides a computer implemented method and system for reviewing of warnings associated with a software code. The software code has plurality of clusters. More particularly, the system and method facilitates improved reporting and reviewing of common point warnings generated in clustered code analysis by eliminating redundancy in reporting and reviewing of the common point warnings.

Figure 1:
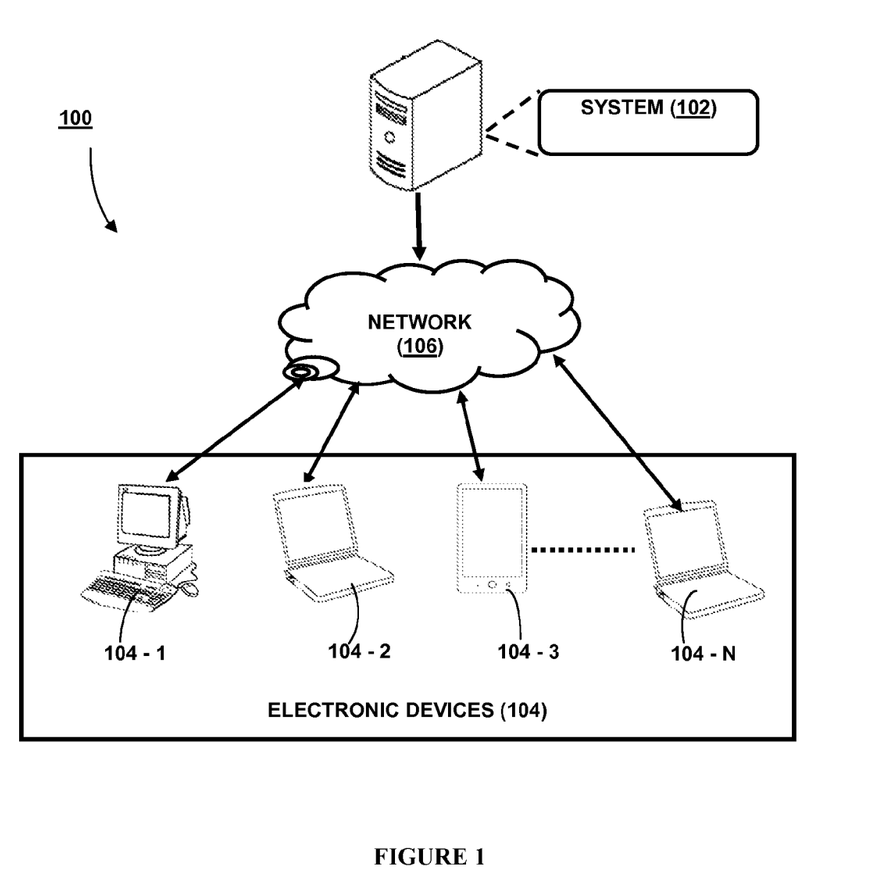
FIG. 1 illustrates a network implementation of a system for improved reviewing of warnings associated with a software code is shown, in accordance with an embodiment of the present subject matter.

Referring now to FIG. 1, a network implementation (100) of a system (102) for improved reviewing of warnings generated in clustered-code analysis is illustrated, in accordance with an embodiment of the present subject matter. Although the present subject matter is explained considering that the system (102) is implemented on a server, it may be understood that the system (102) may also be implemented in a variety of computing systems, such as a laptop computer, a desktop computer, a notebook, a workstation, a mainframe computer, a server, a network server, and the like. In one implementation, the system (102) may be implemented in a cloud-based environment. It will be understood that the system (102) may be accessed by multiple users through one or more user devices (104-1, 104-2, 104-3 . . . 104-N), collectively referred to as user devices (104) hereinafter, or applications residing on the user devices (104). Examples of the user devices (104) may include, but are not limited to, a portable computer, a personal digital assistant, a handheld device, and a workstation. The user devices (104) are communicatively coupled to the system (102) through a network (106).

In one implementation, the network (106) may be a wireless network, a wired network or a combination thereof. The network (106) can be implemented as one of the different types of networks, such as intranet, local area network (LAN), wide area network (WAN), the internet, and the like. The network (106) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network (106) may include a variety of network devices, including routers, bridges, servers, computing devices, storage devices, and the like.

Figure 2:
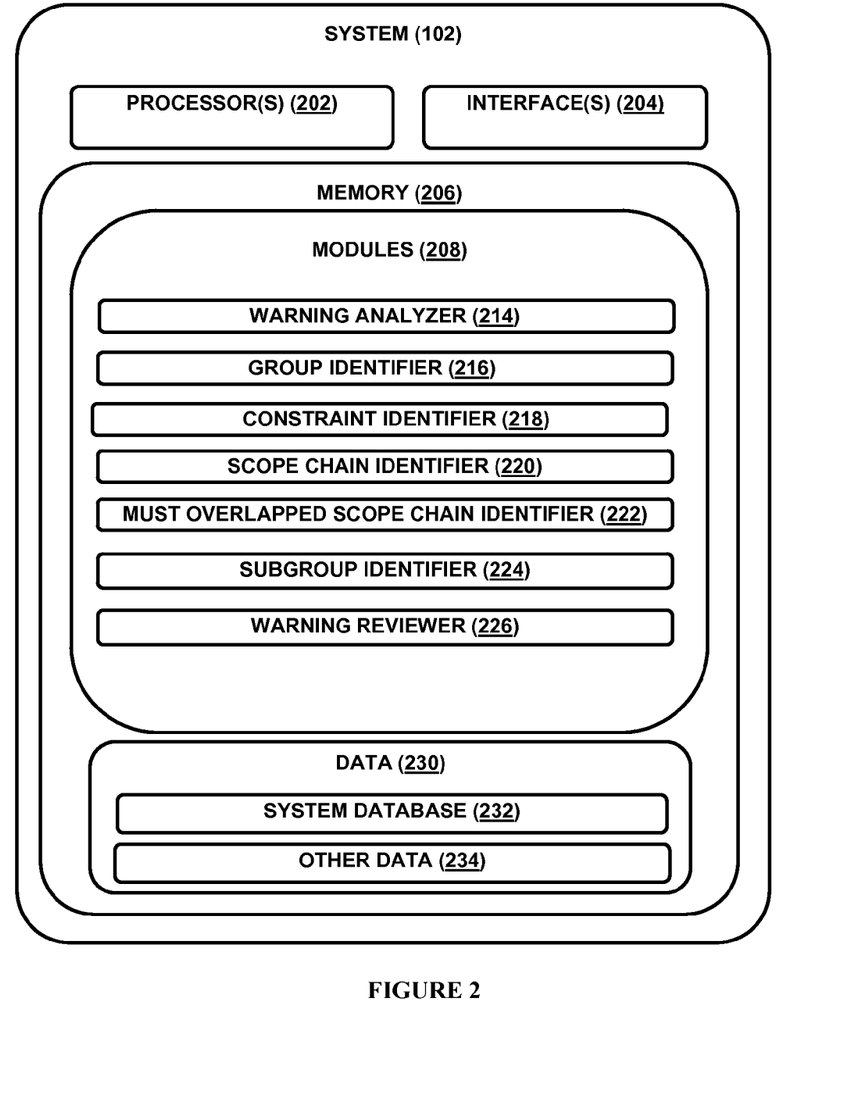
FIG. 2 illustrates the system for reviewing of warnings associated with a software code, in accordance with an embodiment of the present subject matter.

In one embodiment the present invention, referring to FIG. 2, describes a detailed working of the various components of the system (102). In one example, a Static Analysis tool may analyze the clustered software code and generate one or more warnings. The warnings may be reported using a static analysis report viewer (Not shown in figure). The static analysis report viewer is used for presenting the output of the analysis including the warnings generated during the analysis.

In one embodiment of the invention, the warnings generated during analysis of the software code are further analyzed using a warning analyzer module (214). The warning analyzer module (214) separately identifies common point warnings and unique warnings from the warnings generated by a static analysis tool. For the purpose of such identification, the warning analyzer module (214) identifies common point warnings as a set of warnings that correspond to a single unique program point in a code, but gets reported multiple times due to the inclusion of the program point in multiple clusters of the software code. Unique warnings are warning reported for a single cluster and not reported for any other cluster. The inclusion of the single unique program point in multiple clusters may be because a function can get reused (called) in multiple clusters.

Referring to Table 1, for example, w1 warning (corresponding to divide by zero error) is reported for both Task1 and Task2, as the w1 warning corresponds to same program point in reused function f2. Similarly, w2 (corresponding to array index out bound check) warning also gets reported twice being a common-point warning.

Referring to Table 1, for example the warnings w1 and w2 are generated, respectively, because static analyzer, cannot compute precise values for p2 and the expressions denoted by *. Cluster-wise reporting of common point warnings is essential as safety or error at the common point warnings may vary depending on the context of the clusters associated with common point warnings. For instance, the warning w2 may represent a defect (out of bound array access) in Task1 while the same warning w2 may be a safe array access for Task2, and vice versa.

TABLE 1 examples of warnings generated in clustered-code analysis

```
void Task1( )
{ ...
            index = *;
            f1(index);
... }
void Task2( )
{
            ...
            index = *;
            f1(index);
            ... }
const int arr[ ]={0,13,28,46,63};
void f1(int p)
{
            unsigned int i=..., j=...;
            if( i<5 && j<i)
            f2(p, arr[i]-arr[j]);
}
int f2(int p1, int p2)
{
            ... //p1, p2 not modified
            t1 = t2 / p2; // warning w1
            t3 = someArr[p1]; // warning w2
            ...
}
```

The clustered-code analysis results for a software having multiple clusters are cluster-specific. The warnings are generated cluster wise. Hence, the warning generated by the clustered code analysis may be reviewed cluster wise. Therefore common point warnings too may be reviewed cluster wise. Due to such multiple reviews, redundancy occurs in review of common point warnings.

After the separate reporting of the plurality of common point warnings, the group identifier module (216) further facilitates grouping of the common point warnings and reporting of grouped common point warnings. In order to distinguish the common point warnings and the unique warnings and to group the common point warnings, a detailed working of the scope chain identifier module (220) along with the working of other components of the system (102) is illustrated, in accordance with an embodiment of the present subject matter. After generating the warnings, the scope chain identifier module (220), at first, identifies functions, a list of functions, in which a warning is reviewed. In one embodiment, the validation of the warning may start at lowest code scope and later scope may be incremented until decision about the warning is made. For example, referring to Table 1, validating warning w2 in Task1 starts at scope of f2, and on observing insufficiency of the f2 in decision-making, the scope is increased to f1 and later to Task1. Visiting a function to review the warnings in the scope of the function is termed as 'scope function'.

Further, the scope chain identifier module (220) may produce an ordered list of scope functions traversed during manual reviewing of the warning. For instance—a) validating warning w2 in Task2 has a scope chain denoted by f2→f1→Task2 since the decision-making requires Task2 scope, b) inspecting warning w1 of any cluster has a scope chain f2→f1 since the warning gets invalidated (identified as a false warning) at the f2 scope itself. The function at the end of the scope chain is referred as a 'top' of the scope chain. For instance, f1 is the top of the f2→f1 scope chain.

Figure 3:
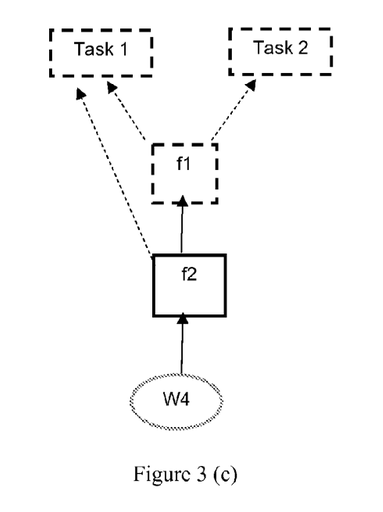
FIG. 3 illustrates examples of overlapped scope chain (OSC), in accordance with an exemplary embodiment of the present subject matter.
Figure 3A:
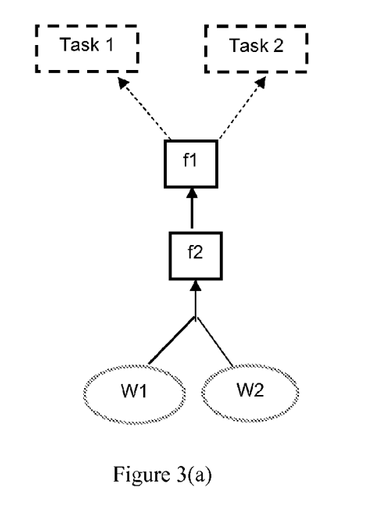
Figure 3B:
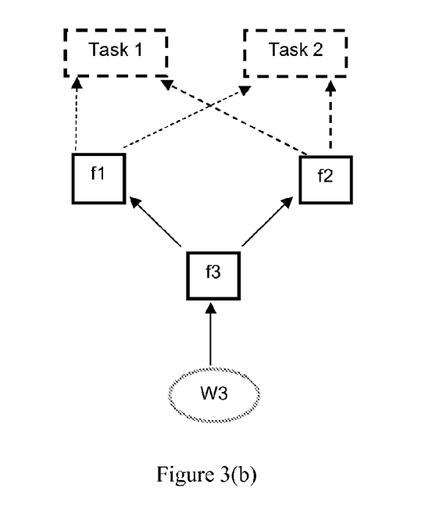

It is observed that the scope chains traversed while validating a common point warning against the associated clusters of the common point warning have initial portion overlapped. A reversed and joint call-graph of multiple clusters in relevance to the common point warning is suitable to compute overlapped scope chains (OSCs). For example, FIG. 3 presents a few examples of call graphs showing overlapped scope chains (OSCs). Further, the must overlapped scope chain identifier module (222) may identify the overlapped scope chains (OSCs) from reversed and joint call-graph of the multiple clusters of the software code in relevance to the common point warning. FIG. 3 (a) corresponds to the code sample in Table 1, and indicates f2→f1 is the OSC while inspecting the w1 (or w2) against both the clusters. Further, the common point warning can have multiple OSCs, and example is shown in FIG. 3(b) where both the scope chains f3→f1 and f3→f2 are OSCs.

Further, the must overlapped scope chain identifier module (222) may identify must overlapped scope chains (must-OSCs) corresponding to the common point warnings. A maximum-length OSC is referred as must-OSC if—a) all the entry functions of clusters associated with common point warnings are strictly reachable from top of the OSC, and b) none of these entry functions is reachable from the warning function without going through the top. For example, f2→f1 in FIG. 3(a), and both the OSCs (f3→f1 and f3→f2) in FIG. 3(b) are must-OSCs. FIG. 3(c) has f2 as the only element of must-OSC of 3(c) cluster.

In practice, every cluster spans over thousands of lines of code and contains several calls to hundreds of functions that are reused across multiple clusters. While inspecting common point warnings, a reviewer is usually not aware of the must-OSCs. Thus, repetitive manual checking of the OSCs get performed leading to redundant efforts. The redundancy of the repetitive manual checking of the OSCs is eliminated through systematic grouping of common point warnings.

The grouping of the common point warnings may include—1) differentiating the warnings that are unique and common to the clusters, 2) cluster-wise reporting of unique warnings, and grouping and reporting the common point warnings together, 3) for each group, reporting the top and length (number of scope functions) of each must-OSC associated with the grouped common point warnings.

After identifying the must overlapped scope chains (must-OSCs) of the common point warnings, the group identifier module (216) may group the common point warnings in a group. The group identifier module (216) groups the common point warnings based on top of must-overlapped scope chains. The top of must OSC is a top most function that is always traversed while reaching from the program point of common point warnings to the cluster entry functions for associated two or more clusters of the common point warnings. Further the constraint identifier module (218) identifies a constraint for each group so formed. The identified constraint maybe a top-most function of must-OSC that may be always visited while reaching from the warning program point to the entry point/function of each of the associated clusters. The constraint identifier module (218) may report a constraint for each of the groups so formed, such that the review output generated by a warning reviewer module (226) may eliminate warnings except a common point warning from each of the one or more groups using a review output for the common point warning, wherein the review output is identified by reviewing the common point warning from each of the one or more groups under the constraint such that the review of the common point warning under the constraint satisfy for reviews of all remaining common point warnings of the corresponding group. When a warning cannot be judged under the given constraint, the group identifier 216 facilitates logging and reusing some part of review information while reviewing other warnings of the same group.

Further the system (102) is such that if the review output generated for one common point warning from the one or more group is adjudged as safe then the warning reviewer module (226) eliminates all other common point warnings for the same group i.e. all the warnings of the group may automatically be adjudged as safe warnings.

TABLE 2

Reporting of groups of common Point warnings

| Group ID | Sub-group Level | Warning | Cluster | Other Details | Sub-Group tops (length) | Group tops (length) | Info to be logged |
|---|---|---|---|---|---|---|---|
| 1 | — | W1 | Task 1 | ... | — | | f1(2) |
| | | W1 | Task 2 | ... | | | |
| 2 | — | W3 | Task 1 | ... | — | | f1(2), f2(2) |
| | | W3 | Task 2 | ... | | | |
| 3 | 1 | W5 | Task 3 | ... | f2(1) | | f2(1) |
| | | W5 | Task 4 | ... | | | |
| | 2 | W5 | Task 1 | ... | f1(2) | | |
| | | W5 | Task 2 | ... | | | |

Figure 3D:
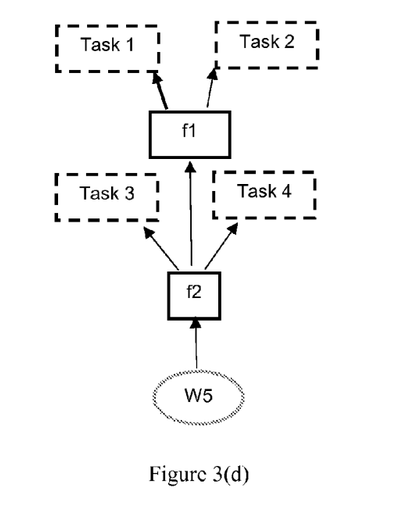

The subgroup identifier module (224) further may partition the groups of common point warnings into multiple subgroups with individually associated top of must overlapped scope chains of the multiple subgroups. The subgroups having separate constraint associated with each subgroup, the subgrouping is done to receive maximum benefits out of the grouping technique. To get maximum benefit out of the grouping approach, the common point warnings are further partitioned into sub-groups based on the length of must-OSCs of the sub-groups. Table 2 also presents an example of two sub-groups corresponding to four common point warnings (w5) in FIG. 3(d). The warnings in clusters Task1 and Task2, and Task3 and Task4 are placed in different sub-groups since length of their must-OSCs differ. The top corresponding to each subgroup is also reported.

The system (102) further enables improved reviewing of the groups and the sub-groups of the common point warnings. During inspection of a common point warning—a) if the warning is judged as a false positive without crossing any of tops reported for that group of the warning, all other grouped warnings are also false positives and they all are eliminated at once. b) if not (a) and the warning is invalidated without crossing a top of subgroup of the warning, then all the warnings of the sub-group of that warning are eliminated together. c) if it is not the case in both (a) and (b), user can log the review information available at the top functions, and reuse the review information later when the rest common point warnings are reviewed in the context of their associated clusters. For example, during review of w2 in Task1 (group 1 in Table 1) a reviewer can log that the warning judgment depends on p. The logged information can be reused while reviewing w2 of Task2, and helps user to start the inspection from calls to f1 function. This way, logging of review information also further avoids some of the review redundancy.

Referring to Table 3, experimental results of implementation of the system (102) are provided. The proposed grouping technique is applied and impact of the grouping technique on review efforts reduction is checked. In App 1: An infotainment system having 14 MLOC code size and consisting of 98 clusters running in parallel. These clusters varied from 4 KLOC to 700 KLOC, and the clusters consisted of total 31288 functions of which 9327 were reused across multiple clusters. In App 2: An embedded system (10 KLOC size) distributed in 29 clusters. The embedded system spanned over 83 functions of which 14 were reused. The applications App 1 and App 2 were verified for Zero Division (ZD), Array Index Out of Bound (AIOB), Illegal Dereference of a Pointer (IDP), and OverFlow-UnderFlow (OFUF), as these are commonly checked properties in software verification. The experimental results are presented in Table 3. Columns such as Groups ALM and Sub-groups ALM in the Table 3 denote average length of must-OSCs associated with the groups so formed.

TABLE 3

Experimental Results

| Application | Verification Property | Total Warnings | Grouping analysis time (seconds) | Grouped Warnings | Groups Formed | Groups with 5+ warnings | Groups with multiple tops | Groups ALM | Sub-grouping analysis time (seconds) | Groups having sub-groups | Total Sub-groups | Sub-groups ALM |
|---|---|---|---|---|---|---|---|---|---|---|---|---|
| App1 | ZD | 825 | 1 | 494 | 117 | 53 | 2 | 2.23 | 2 | 53 | 127 | 3.11 |
| | AIOB | 12946 | 22 | 5765 | 1199 | 229 | 42 | 2.61 | 75 | 369 | 1058 | 3.43 |
| | IDP | 99762 | 67 | 52412 | 8630 | 2234 | 338 | 2.48 | 620 | 3473 | 40290 | 2.84 |
| | OFUF | 100066 | 41 | 38897 | 7515 | 1989 | 661 | 2.78 | 324 | 2773 | 8316 | 3.11 |
| App2 | ZD | 5 | 0.1 | 4 | 2 | 0 | | 1.5 | — | 0.1 | 0 | 0 | 0 |
| | AIOB | 72 | 0.5 | 0 | 0 | 0 | 0 | 0 | — | 0 | 0 | 0 |
| | IDP | 559 | 1 | 173 | 48 | 11 | 1 | 1.25 | 1 | 25 | 54 | 1.74 |
| | OFUF | 321 | 1 | 53 | 15 | 3 | 0 | 1 | 1 | 10 | 25 | 1.6 |

Listed below are few observations made from the results provided in Table 3. 1) Around 45% of total warnings are grouped being common point warnings, and among them, only 18% are unique. 2) A high percentage of groups formed (25%) include 5 or more warnings. 3) Around 6% of the groups have multiple tops indicating that reviewing of these warnings of the groups having multiple tops require higher efforts than efforts in reviewing grouped warnings with single top. 4) The ALM of the sub-groups is always greater than ALM of the groups, because must-OSCs of a group are contained in the must-OSCs of sub-groups of the group.

TABLE 4

Manual Review Results

| Application | Property | Warnings reviewed | Groups (warnings) eliminated at once | sub-groups (warnings) eliminated at once | Log info reused groups (warnings) |
|---|---|---|---|---|---|
| App1 | AIOB | 80 | 65 (221) | 4 (13) | 5 (10) |
|  | OFUF | 60 | 40 (244) | 3 (6) | 12 (23) |
| App2 | ZD | 2 | 1 (2) | 0 | 1 (2) |
|  | IDP | 23 | 4 (9) | 3 (7) | 14 (38) |
|  | OFUF | 15 | 9 (31) | 2 (4) | 1 (2) |
| Total |  | 180 | 119 (487) | 12 (30) | 33 (75) |

In order to check impact of the grouping technique, 180 warnings are randomly selected belonging to different groups and reviewed manually. Table 4 presents results of the review of the groups of warnings. The results indicate— 1) reviewing of 131 warnings collectively lead to elimination of 517 warnings, 2) around 66% (119 out of 180) groups got eliminated just by inspecting a single warning from each group, 3) sub-grouping helped to eliminate some of the warnings when the top level grouping failed to do so, 4) review information gathered while inspecting 33 warnings got reused during reviews of other 42 warnings. To check impact of the grouping technique on efforts reduction, 640 warnings belonging to the above 180 groups are reviewed in two different settings—1) individual reviewing (without grouping), and 2) groups-based reviewing.

The experiment indicated that around 50%-70% of the review efforts are saved by the group-based warnings elimination, logging and reusing of the review information. The saving is found to be varying as per skills of the reviewers, tools support used, previous knowledge of the code and the like. It is to be noted that the saving achieved is with respect to the common point warnings only, as warnings unique to a cluster are not part of the grouping.

The present disclosure discloses that a high percentage of warnings, around 45%, are observed as common point warnings because software applications reuse a lot of code. Due to reuse of the lot of code, a lot of warnings get reported multiple times, it is demonstrated that although the analysis results are cluster-specific, all of the warnings need not be reviewed separately. The redundancy incurred while reviewing the warnings individually in the context of the associated tasks of the warnings is eliminated by the grouping of the warnings. The major contribution of the presented disclosure lies in identifying must-OSCs based grouping criterion, reporting tops of the identified must-OSCs for each group, and making the must-OSCs as part of a warning review process. The experiments revealed that around 66% of the total groups formed are eliminated just by reviewing a single warning from each of the group. The groups-based elimination, and the logging of review information when decision about a warning at a top function cannot be made, collectively leads to 60% of manual efforts reduction.

Without the grouping approach, the saved efforts unnecessarily would have been spent in inspecting the same code multiple times. Further, the experimental results also demonstrated that sub-grouping is helpful to eliminate some of the warnings when the first level grouping fails to do so. AIOB, ZD, OFUF, and IDP properties are considered in the experiments; however, the proposed grouping technique can be applied to the warnings generated for other properties such as un-initialized variables. Although embedded domain application written in 'C' language is used for the experiments, similar benefits may be expected on other domain/language applications as well, due to common coding practices.

In one embodiment, the system (102) of the present disclosure provides a technique to compute the must overlapped scope chains. In order to compute the must overlapped scope chains, the system (102) builds complete application call graph. The technique disclosed in the present disclosure is light weight technique to compute review (grouping) constraint within very less time, as computation of the review (grouping) constraint requires checking of every function through which a common point warning function is called, for suitability of the function for top of the must-overlapped scope chains (that is, constraint). The GUI/interface (204) provided by the present system (102) is user friendly and targeting presentation of important information, allowing user to log and reuse the review information. Using the system and method of the present disclosure around 60% of manual review efforts required in reviewing of common point warnings are reduced.

The Exemplary embodiments discussed above may provide certain advantages. Though not required to practice aspects of the disclosure, these advantages may include those provided by the following features.

Some embodiments enable a system and a method to distinguish common point warnings and unique warnings, and separate reporting of the common point warnings and the unique warnings.

Some embodiments enable a system and a method to facilitate improved reporting and reviewing of the common point warnings generated in clustered-code analysis by eliminating redundancy in reporting and reviewing of the common point warnings.

Some embodiments enable a system and a method to facilitate logging and later providing review assisting information that helps users while reviewing the common point warnings.

Some embodiments enable the system and the method to facilitate reducing review efforts by removing redundancy in reviewing of the common point warnings by grouping and sub-grouping of the common point warnings based on top of must-overlapped scope chains and constraint-based reviewing of groups and sub-groups of the common point warnings.

Figure 4:
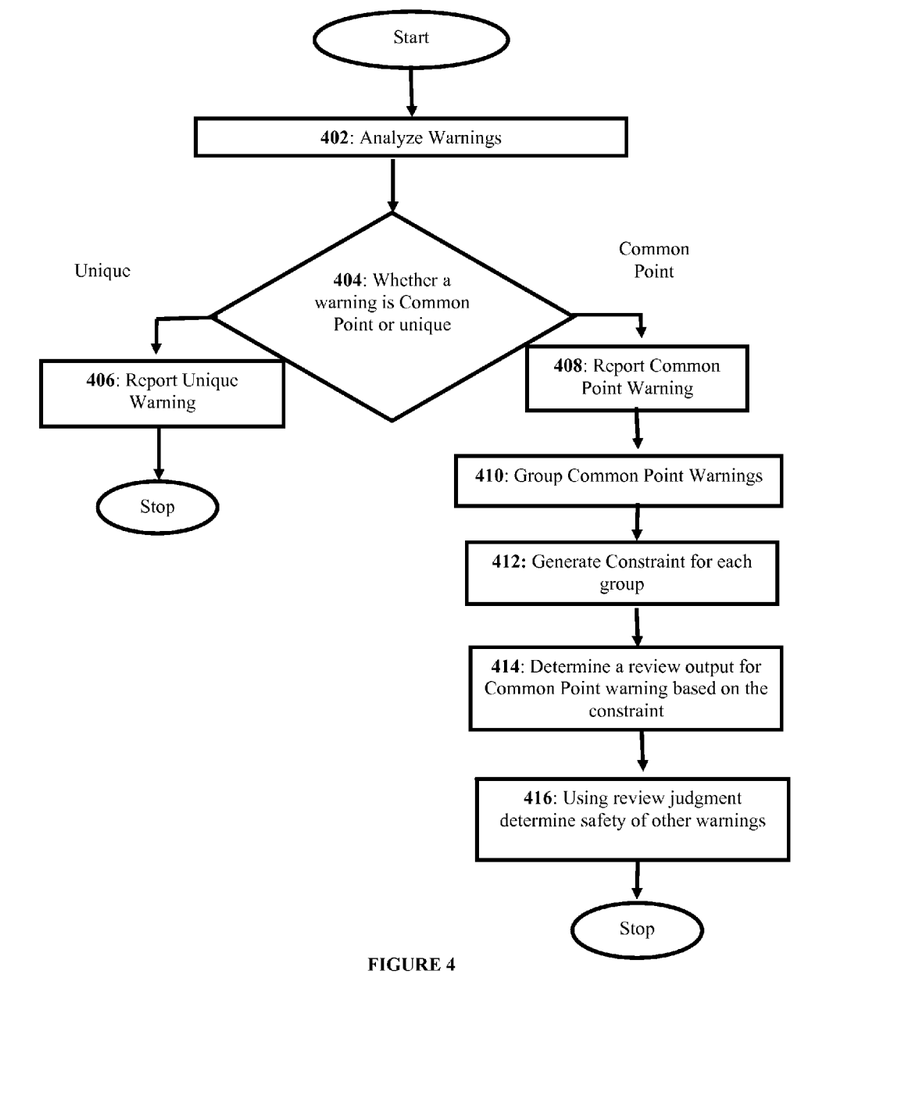
FIG. 4 illustrates a flow diagram illustrating the method for reviewing warnings associated with a software code, in accordance with an exemplary embodiment of the present subject matter.

Referring to FIG. 4 a flow chart illustrating a method comprising steps for improved reviewing of warnings generated in clustered-code analysis is described, in accordance with an embodiment of the present subject matter is shown.

The method may be described in general in terms of computer executable instructions Generally, computer executable instructions can include routines, programs, objects, components, data structures, procedures, modules, functions, etc., that perform particular functions or implement particular abstract data types. The method of FIG. 4 may also be practiced in a distributed computing environment where functions are performed by remote processing devices that are linked through a communications network.

In a distributed computing environment, computer executable instructions may be located in both local and remote computer storage media, including memory storage devices.

The order in which the method is described is not intended to be construed as a limitation, and any number of the described method blocks can be combined in any order to implement the method referred to in FIG. 4 or any alternate methods. Further, individual blocks may be deleted from the method referred to in FIG. 4 without departing from the spirit and scope of the subject matter described herein. Furthermore, the method can be implemented in any suitable hardware, software, firmware, or combination thereof. However, for ease of explanation, in the embodiments described below, the method of FIG. 4 may be considered to be implemented in the above described system (102).

The process starts at step (402), where a plurality of warnings are analyzed to identify the warnings as unique warnings or common point warnings. The identified Common point warnings are a set of warnings that are common to two or more clusters (common point warnings) and unique warning are warnings that are reported only for a single cluster.

At the step (404), the determination of warnings being a unique warning or Common point warnings for each cluster is made. Once the warnings are so identified they are reported as unique warnings or common point warnings or unique warnings at step (406) and (408) respectively.

At the step (410), the common point warnings reported at step (408) are grouped. In one embodiment the grouping of the common point warnings may include as shown in step 406 1) differentiating the warnings that are unique and common to the clusters, 2) cluster-wise reporting of unique warnings, and grouping and reporting the common point warnings together, 3) for each group, reporting the top and length (number of scope functions) of each must-overlapped scope chains associated with the grouped common point warnings.

At the step (412), a constraint is identified for the reviewing of warnings in each group of common point warnings formed at step (410). The identified constraint may be a top-most function that may be always visited while reaching from the warning program point to entry point/function of each of the associated clusters.

At the step (414), a review output indicating a review judgement is generated, such that review judgement of a grouped warning under given constraint is applicable to reviews of all other warnings from the same group. This way only one warning from the group needs to be reviewed. Further when a warning cannot be judged under the given constraint, the review information available at the associated top function may be logged, and complete or some part of this review information may be used while reviewing other warnings of the same group.

The process ends at the step (416), the review judgement generated at step (414) is used to determine whether the other warnings from the same groups may be adjudged as safe or false warnings.

To get maximum benefit out of the grouping approach, the common point warnings may be further partitioned into sub-groups based on the length of must-OSCs. The method referred to in FIG. 4 further comprises partitioning of the groups of the common point warnings (warnings in a group) into multiple sub-groups. The method of FIG. 4 comprises partitioning the groups of the common point warnings into the multiple sub-groups with separately associated tops of must overlapped scope chains corresponding to each of the sub-groups.

During inspection of the common point warning—a) if the warning is judged as a false positive without crossing any of tops reported for that group of the warning, all other grouped warnings are also false positives and they all are eliminated at once. b) if not (a) and the warning is invalidated without crossing a top of subgroup of the warning, then all the warnings of the sub-group of that warning are eliminated together. c) if it is not the case in both (a) and (b), user can log the review information available at the top functions, and reuse the review information later when the rest common point warnings are reviewed in the context of their associated clusters.

The method of figure four is such that if the review output for one common point warning from the one or more group is adjudged as safe, then all other common point warnings may be eliminated using processor for the same group i.e. all the warnings of the group may automatically be adjudged as safe warnings.

The method of figure may further comprise generating a report having all the common point warnings, groups of the common point warnings, and sub-groups of the groups of the common point warnings along with the associated constraints.

Although implementations for methods and systems for improved reviewing of warnings generated in clustered-code analysis have been described in language specific to structural features and/or methods, it is to be understood that the appended claims are not necessarily limited to the specific features or methods described. Rather, the specific features and methods are disclosed as examples of implementations for improved reviewing of warnings generated in clustered-code analysis.

What is claimed is:

1. A method for reviewing warnings associated with a software code, the method comprising:

identifying, by a warning analyzer module, common point warnings and one or more unique warnings from the warnings associated with the software code, wherein the software code has multiple clusters, and the warnings are generated, by a static analysis tool, in a cluster wise static analysis of the software code, and wherein a common point warning is common with two or more clusters of the multiple clusters;

identifying, by a group identifier module, a top of must overlapped function for each of the common point warnings, wherein the top of must overlapped function for the common point warnings is a top-most function that is always traversed while reaching from a warning program point to a cluster entry function for associated two or more clusters of the common point warning, wherein the top of must overlapped function represents a function at an end of a scope chain;

generating, by the group identifier module, one or more groups of the common point warnings based on the top of must overlapped function;

assigning, by a constraint identifier module, the top of must overlapped function as a constraint for a corresponding group of common point warnings, wherein a review based on the constraint is applicable for the review of each of the common point warnings of the same group; and eliminating, by a warning reviewer module, warnings except a common point warning from each of the one or more groups using a review output of the common point warning, wherein the review output is identified by reviewing the common point warning from each of the one or more groups under the constraint such that the review of the common point warning under the constraint satisfies for reviews of all remaining common point warnings of the corresponding group and remaining common point warnings from the corresponding group are automatically adjudged as safe warnings or errors based on the review output of the common point warning.

2. The method of claim 1, wherein the common point warning corresponds to a single unique program point in the code and gets reported multiple times due to inclusion of the program point into two or more clusters.

3. The method of claim 1, wherein identifying the must overlapped function for each of the common point warnings further comprises:
 identifying, by a scope chain identifier module, one or more scope function chains, wherein the one or more scope function chains are chains of functions, wherein the function gets called from a cluster entry function from the chain of functions, and the functions are traversed while reviewing the common point warning; and
 identifying, by a must overlapped scope chain identifier module, one or more must overlapped scope chains for each of the one or more groups, wherein the one or more must overlapped scope chain functions are part of the one or more scope function chains that are always traversed while reviewing a common point warning from each of the one or more groups.

4. The method of claim 1, further comprising generating, by a subgroup identifier module, one or more subgroups by dividing the one or more groups of the common point warnings, wherein the sub-grouping of common point warnings is based on a second top of must overlapped function, such that the second top of must overlapped function is a top-most function that is always traversed while reaching from warning program point to the cluster entry functions of the clusters associated with the warnings in the sub-group.

5. The method of claim 4, further comprising:
 generating, by the constraint identifier module, a second output, indicating a second constraint for each of the one or more subgroups such that the constraint is applicable to reviews of all warnings of each of the one or more subgroups.

6. A system for reviewing warnings associated with software code, the system comprising a processor, a storage medium coupled to the processor, and:
 a warning analyzer module to identify, common point warnings and one or more unique warnings from warnings associated with a software code, wherein the software code has multiple clusters and the warnings are generated in a cluster wise static analysis of the software code by a static analysis tool, and wherein a common point warning is common with two or more clusters of the multiple clusters;
 a group identifier module to,
  identify, a top of must overlapped function for each of the common point warnings, wherein the top of must overlapped function for the common point warnings is a top-most function that is always traversed while reaching from a warning program point to cluster entry functions for associated two or more clusters of the common point warning, wherein the top of must overlapped function represents a function at end of a scope chain;
  generate, one or more groups of the common point warnings based on the top of must overlapped function, a constraint identifier module to assign, the top of must overlapped function as a constraint for a corresponding group of common point warnings, wherein a review based on the constraint is applicable for a review of each of the common point warnings of the same group; and
 a warning reviewer module to eliminate warnings except a common point warning from each of the one or more groups using a review output of the common point warning, wherein the review output is identified by reviewing the common point warning from each of the one or more groups under the constraint such that the review of the common point warning under the constraint satisfies for reviews of all remaining common point warnings of the corresponding group and remaining common point warnings from the corresponding group are automatically adjudged as safe warnings or errors based on the review output of the common point warning.

7. The system of claim 6, further comprising:
 a scope chain identifier module to identify, one or more scope function chains, wherein the one or more scope function chains are chains of functions, and wherein a function gets called from a cluster entry function of the chain of functions, and the functions are traversed while reviewing the common point warning; and
 a must overlapped scope chain identifier module to identify, one or more must overlapped scope chains for each of the one or more groups, wherein the one or more must overlapped scope chain functions are part of the one or more scope function chains that are always traversed while reviewing a common point warning for each of the one or more groups.

8. The system of claim 7, further comprising:
 a subgroup identifier module to generate, one or more subgroups by dividing the one or more groups of the plurality of common point warnings, wherein the sub-grouping of common point warnings is based on a top of must overlapped function, such that the top of must overlapped function is a top-most function that is always traversed while reaching from the warning program points to the respective cluster entry functions.

9. The system of claim 8, further comprising:
 the constraint identifier module further configured to generate a second output, indicating a second constraint for each of the one or more subgroups such that the constraint is applicable to reviews of all warnings of each of the one or more subgroups.

10. A non-transitory computer readable medium storing instructions, which when executed by a processor on a system, cause the processor to:
 identify, by a warning analyzer module, common point warnings and one or more unique warnings from warnings associated with a software code, wherein the software code has multiple clusters, and the warnings are generated, by a static analysis tool, in a cluster wise analysis of the software code, and wherein a common point warning is common with two or more clusters of the multiple clusters;
 identify, by a group identifier module, a top of must overlapped function for each of the common point warnings, wherein the top of must overlapped function for a common point warning is a top-most function that is always traversed while reaching from a warning program point to a cluster entry function for associated two or more clusters of the common point warning, wherein the top of must overlapped function represents a function at end of a scope chain;

generate, by the group identifier module, one or more groups of the common point warnings based on the top of must overlapped function;

assign, by a constraint identifier module, the top of must overlapped function as a constraint fora corresponding group of common point warnings, wherein a review based on the constraint is applicable for a review of each of the common point warnings of the same group; and eliminate, by a warning reviewer module, warnings except a common point warning from each of the one or more groups using a review output of the common point warning, wherein the review output is identified by reviewing the common point warning from each of the one or more groups under the constraint such that the review of the common point warning under the constraint satisfies for reviews of all remaining common point warnings of the corresponding group and remaining common point warnings from the corresponding group are automatically adjudged as safe warnings or errors based on the review output of the common point warning.

11. The non-transitory computer readable medium of claim 10, further storing instructions which when executed by the processor on the system, cause the processor to:

identify, by a scope chain identifier module, one or more scope function chains, wherein the one or more scope function chains are chains of functions, and wherein a function gets called from a cluster entry function from the chain of functions, and are traversed while reviewing the common point warning; and identify, by a must overlapped scope chain identifier module, one or more must overlapped scope chains for each of the one or more groups, wherein the one or more must overlapped scope chain functions are part of the one or more scope function chains that are always traversed while reviewing a common point warning for each of the one or more groups.

12. The non-transitory computer readable medium of claim 10, further storing instructions which when executed by the processor on the system, cause the processor to:

generate, by a subgroup identifier module, one or more subgroups by dividing the one or more groups of the plurality of common point warnings.

13. The non-transitory computer readable medium of claim 12, further storing instructions which when executed by the processor on the system, cause the processor to:

generate, by the constraint identifier module, a second output, indicating a second constraint for each of the one or more subgroups such that the constraint is applicable to reviews of all warnings of each of the one or more subgroups.

* * * * *

UNITED STATES PATENT AND TRADEMARK OFFICE
CERTIFICATE OF CORRECTION

| | | |
|---|---|---|
| PATENT NO. | : 10,025,699 B2 | Page 1 of 1 |
| APPLICATION NO. | : 14/868873 | |
| DATED | : July 17, 2018 | |
| INVENTOR(S) | : Tukaram B. Muske | |

It is certified that error appears in the above-identified patent and that said Letters Patent is hereby corrected as shown below:

In the Claims

Column 17, Claim 10, Line 7, change "fora" to --for a--

Signed and Sealed this
Twenty-first Day of August, 2018

Andrei Iancu
*Director of the United States Patent and Trademark Office*